US011772581B2

(12) United States Patent
Balsmeier

(10) Patent No.: US 11,772,581 B2
(45) Date of Patent: Oct. 3, 2023

(54) TRANSFER PORTS FOR CONFINEMENT GLOVEBOXES AND RELATED METHODS

(71) Applicant: Battelle Energy Alliance, LLC, Idaho Falls, ID (US)

(72) Inventor: Aaron A. Balsmeier, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 219 days.

(21) Appl. No.: 17/061,333

(22) Filed: Oct. 1, 2020

(65) Prior Publication Data

US 2021/0101542 A1 Apr. 8, 2021

Related U.S. Application Data

(60) Provisional application No. 62/909,887, filed on Oct. 3, 2019.

(51) Int. Cl.
*B25J 21/02* (2006.01)
*B60R 15/00* (2006.01)

(52) U.S. Cl.
CPC ............... *B60R 15/00* (2013.01); *B25J 21/02* (2013.01)

(58) Field of Classification Search
CPC ................................ B60R 15/00; B25J 21/02
USPC .............................................................. 312/1
See application file for complete search history.

(56) References Cited

U.S. PATENT DOCUMENTS 2,862,307 A * 12/1958 Bloomer .................. B25J 21/02 34/92
4,059,903 A * 11/1977 Piet ...................... A61C 19/007 422/504
4,668,153 A 5/1987 Sperinck et al.
5,061,858 A * 10/1991 Mallory .................... G21F 5/12 250/507.1
5,139,318 A 8/1992 Broxup
5,783,156 A * 7/1998 Renzi ........................ F26B 5/06 422/38
5,861,305 A * 1/1999 Silley ..................... C12M 41/14 422/527
6,213,360 B1 4/2001 Aluisi
8,328,042 B2 * 12/2012 Canty ....................... B01L 1/02 220/663
9,194,175 B2 11/2015 Lemonds
2012/0235548 A1 * 9/2012 Cordes ................. B08B 7/0092 312/1
2015/0022065 A1 * 1/2015 Lemonds ................ E05C 7/002 49/506
2017/0021510 A1 1/2017 Guerin

FOREIGN PATENT DOCUMENTS

WO 2012/175506 A1 12/2012

* cited by examiner

*Primary Examiner* — James O Hansen
(74) *Attorney, Agent, or Firm* — TraskBritt

(57) ABSTRACT

Transfer ports for confinement gloveboxes may include a flange sized and shaped to be secured within an opening in a wall of a glovebox. A sleeve may be secured to the flange and define a passage through the flange. A first cap may be removably secured to the sleeve on a first side of the flange and obstruct the passage on the first side. A second cap may be removably secured to the sleeve on a second, opposite side of the flange and obstruct the passage on the second side.

20 Claims, 5 Drawing Sheets

110
104
100
200
112
114
106
108
102
116
118
106

302
110
200
304
330
316
320
206
322
352
112
336
318
208
308
348
114
362
212
314
356
306
312
310
344
342
332
360
358
210
354
334
338
340
314
322
346
350
316
324
208
330
326
328

TRANSFER PORTS FOR CONFINEMENT GLOVEBOXES AND RELATED METHODS

CROSS-REFERENCE TO RELATED APPLICATION

This application claims the benefit under 35 U.S.C. § 119(e) of U.S. Provisional Patent Application Ser. No. 62/909,887, filed Oct. 3, 2019, for RADIOACTIVE CONFINEMENT GLOVEBOX TRANSFER PORT, the disclosure of which is incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

FIELD

This disclosure relates generally to transfer ports for confinement gloveboxes. More specifically, disclosed embodiments relate to transfer ports for confinement gloveboxes that may enable easier deployment of the transfer ports, easier replacement and reconditioning of the transfer ports, reduce human exposure to potentially hazardous materials and environments, reduce costs and waste, and enable more automated interaction with the transfer ports and associated material transfer through the transfer ports.

BACKGROUND

Confinement gloveboxes may be used with advanced microscopes to reduce human exposure to potentially hazardous materials. These gloveboxes typically include an enclosure of a material having a thickness and material properties sufficient to reduce or eliminate risk to humans located outside the enclosure. At least a portion of the enclosure may be transparent or translucent to provide visibility into the interior of the enclosure. One or more ports may be provided in the enclosure, and compatible glove accessories may mate with the ports to enable users to manipulate objects within the enclosure using the glove accessories.

BRIEF SUMMARY

In some embodiments, transfer ports for confinement gloveboxes may include a flange sized and shaped to be secured within an opening in a wall of a glovebox. A sleeve may be secured to the flange and define a passage through the flange. A first cap may be removably secured to the sleeve on a first side of the flange and obstruct the passage on the first side. A second cap may be removably secured to the sleeve on a second, opposite side of the flange and obstruct the passage on the second side.

In other embodiments, transfer ports for confinement gloveboxes may include a flange sized and shaped to be secured within an opening in a wall of a glovebox. A first sleeve member may be secured to the flange on a first side of the flange. A second sleeve member may be secured to the flange on a second, opposite side of the flange, the first sleeve member and the second sleeve member sized and shaped to, in combination, define a passage through the flange. A first cap may be removably secured around the first sleeve on the first side of the flange and obstruct the passage on the first side. A second cap may be removably secured at least partially within the second sleeve on the second side of the flange and obstruct the passage on the second side.

In other embodiments, methods of assembling transfer ports for confinement gloveboxes may involve securing a sleeve to a flange sized and shaped for securing within an opening in a wall of a glovebox, the sleeve defining a passage through the flange. A first cap may be removably secured to the sleeve on a first side of the flange and obstruct the passage on the first side. A second cap may be removably secured to the sleeve on a second, opposite side of the flange and obstruct the passage on the second side utilizing the second cap.

In other embodiments, methods of using transfer ports for confinement gloveboxes may involve removing a first cap from a sleeve on a first side of a flange secured within an opening in a wall of a glovebox to gain access to a passage from the first side outside the glovebox. The sleeve may be secured to the flange and may define the passage through the flange. An object may be placed in the passage. The first cap may be secured to the sleeve on the first side. A second cap may be removed from the sleeve on a second, opposite side of the flange within the glovebox to gain access to the passage on the second side. The object may be removed from the passage from within the glovebox.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

The illustrations presented in this disclosure are not meant to be actual views of any particular confinement glovebox, transfer port, or component thereof, but are merely idealized representations employed to describe illustrative embodiments. Thus, the drawings are not necessarily to scale.

Disclosed embodiments relate generally to transfer ports for confinement gloveboxes that may enable easier deployment of the transfer ports, easier replacement and reconditioning of the transfer ports, reduce human exposure to potentially hazardous materials and environments, reduce costs and waste, and enable more automated interaction with the transfer ports and associated material transfer through the transfer ports. More specifically, disclosed are embodiments of transfer ports that may be received in existing ports for gloves and other accessories used with confinement gloveboxes, may use an airlock-style passage to reduce exposure of humans to potentially hazardous materials and environments, may have one or more other ports to enable testing and optional control of the sealed environment within the transfer port, may include internal receptacles within the transfer ports to enable easier handling and transfer of items through the transfer ports, and may enable easier manipulation of the transfer port and objects passing therethrough utilizing at least partially automated equipment, such as, for example, master/slave manipulators.

As used herein, the terms “substantially” and “about” in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

Figure 1:
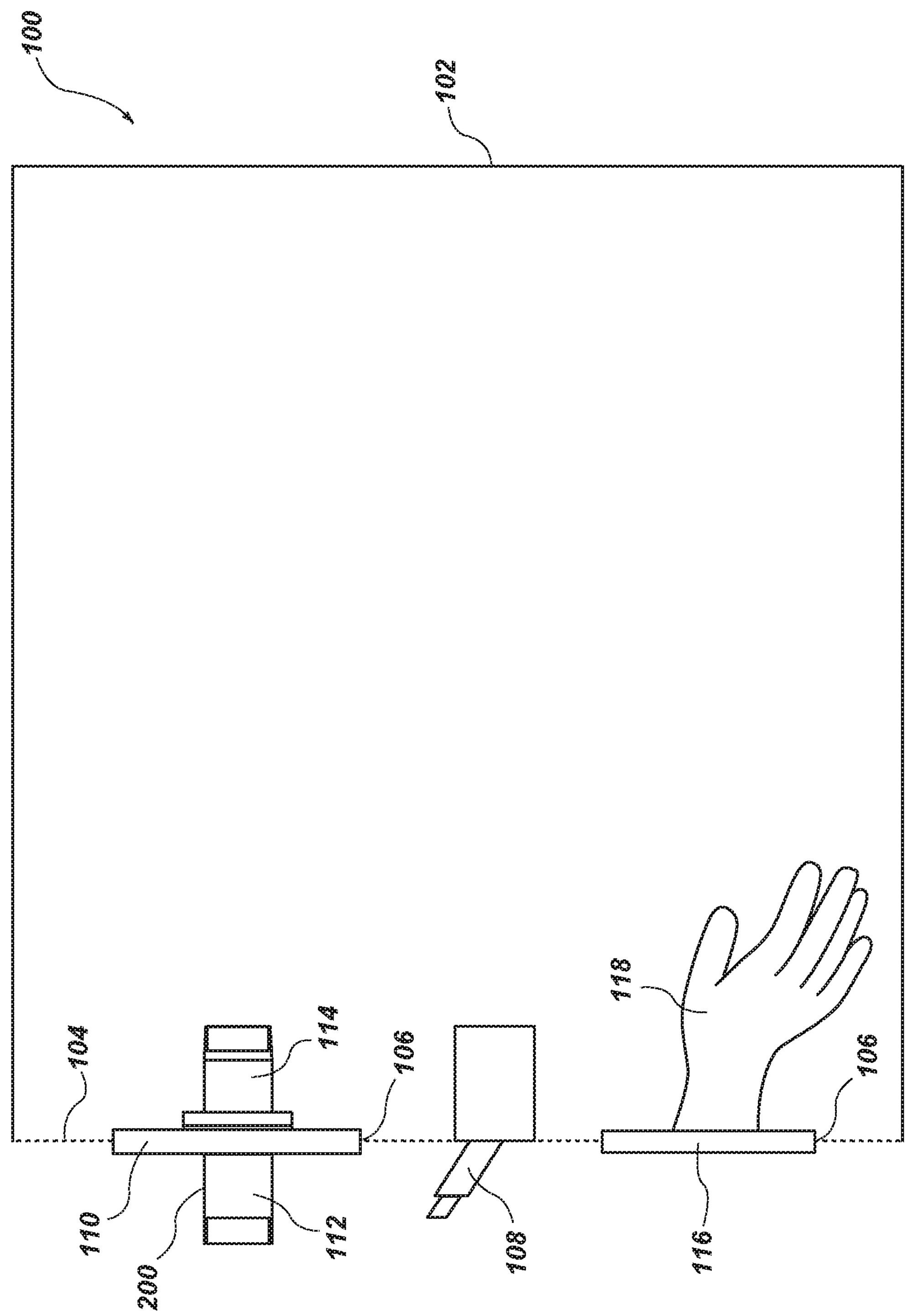
FIG. 1 is a schematic, side view of a confinement glovebox including a transfer port in accordance with this disclosure.

FIG. 1 is a schematic, side view of a confinement glovebox 100 including a transfer port 200 in accordance with this disclosure. The confinement glovebox 100 may include an enclosure 102 configured to contain potentially hazardous materials within the enclosure 102, reduce human exposure outside the enclosure 102 to those potentially hazardous materials and any associated potentially hazardous environment generated thereby, and provide a controlled environment within an interior of the enclosure 102. For example, the enclosure 102 may be fillable to the extent commercially and technically practicable with an inert gas (e.g., argon), and placeable at lower pressure than an environment at an exterior of the enclosure 102 (e.g., lower than ambient pressure) so as to reduce the risk of leaking gases and particles suspended therein from the interior to the exterior of the enclosure 102. Suitable materials for the walls 104 of the enclosure 102 include, for example, metals, metal alloys, and plastics.

At least a portion of at least one wall 104 of the enclosure 102 may be transparent or translucent, so as to enable a user to view the interior of the enclosure 102 while standing outside the enclosure 102. At least one of the walls 104 of the enclosure 102 may include one or more openings 106 extending through the respective wall 104 and providing fluid communication between the interior and the exterior of the enclosure 102 when the openings 106 are unobstructed. The wall 104 or walls 104 including the opening 106 or openings 106 may include, or exclude, the transparent or translucent wall 104 and/or the wall 104 including the transparent or translucent portion. A microscope 108 may be oriented to inspect at least one region within the enclosure 102. While the microscope 108 is depicted in the schematic of FIG. 1 as a lens-based microscope 108 configured to magnify light reflected off an object for viewing by the human eye, other, more advanced microscopes may be utilized in connection with the confinement glovebox 100, such as, for example, scanning electron microscopes, scanning probe microscopes, or X-ray microscopes.

A transfer port 200 in accordance with this disclosure may be supportable within a respective opening 106 in the enclosure 102 to occlude the opening 106 and grant selective passage between the interior and the exterior of the enclosure 102. The transfer port 200 may include a first flange 110 sized and shaped to be secured within, and be in sealing contact with, a periphery of the opening 106. In some embodiments, the first flange 110 of the transfer port 200 may be exchanged into and out from the opening 106 while at least substantially maintaining a controlled atmosphere within the enclosure 102, as is the case with other accessories for openings 106.

The transfer port 200 may include a first cap 112 configured to be located on a first side of the first flange 110 and to obstruct a passage through the first flange 110 on the first side when the first cap 112 is secured to the transfer port 200. For example, the first cap 112 may be securable to the transfer port 200 on an exterior-facing side of the first flange 110 to occlude a passage through the first flange 110, and may be removable from the transfer port 200 to grant access to the passage through the first flange 110 from the exterior-facing side of the first flange 110.

The transfer port 200 may include a second cap 114 configured to be located on a second, opposite side of the first flange 110 and to obstruct the passage through the first flange 110 on the second side when the second cap 114 is secured to the transfer port 200. For example, the second cap 114 may be securable to the transfer port 200 on an interior-facing side of the first flange 110 to occlude the passage through the first flange 110, and may be removable from the transfer port 200 to grant access to the passage through the first flange 110 from the interior-facing side of the first flange 110. When the first cap 112 and the second cap 114 are removed from the transfer port 200, objects may be passed through the passage of the transfer port 200 from the exterior of the enclosure 102 to the interior of the enclosure 102, and vice versa. Objects to be passed through the transfer port 200 may include, for example, subject materials for inspection by the microscope 108, tools and components for repairing, disassembling, assembling, or otherwise interacting with items in the interior of the enclosure 102, tools for inspecting subject materials or the atmosphere in the interior of the enclosure 102, and other objects and materials that may be of use in the interior of a confinement glovebox 100.

Other openings 106 extending through the wall 104 or walls 104 may be occupied by other accessories for use with the confinement glovebox 100. For example, one or more of the other openings 106 may include a glove port 116 supported within the respective other opening 106 for a user to introduce the user’s hand into an associated glove from the exterior of the enclosure 102 and to manipulate objects within the enclosure 102 with the glove 118 acting as a barrier between the user’s hand and the materials and atmosphere within the enclosure 102. As another example, one or more of the other openings 106 may include a port cover (not shown) supported within the respective other opening 106 to occlude the respective opening 106 when an accessory having more functionality, such as, for example, a transfer port 200 or glove port 116, is not required for a given application.

Conventionally, passing an object from an exterior of the enclosure 102 to the exterior, or vice versa, requires the use of an expensive, custom manufactured, preinstalled transfer port or a wasteful process of replacing glove ports 116. For example, an object may be placed in the interior-facing portion of a glove port 116 to be installed in the confinement glovebox 100, and the object and glove port 116 may be placed adjacent to an existing, installed glove port 116 or port cover. The previously installed glove port 116 or port cover may be pushed into the interior of the enclosure 102 as the glove port 116 having the object in the interior-facing portion thereof is installed into the same opening 106, replacing the previously installed glove port 116. Because the glove ports 116 and other accessories can be exchanged while at least substantially maintaining the interior of the enclosure 102 sealed and contained, objects can be passed from the exterior to the interior of the enclosure 102 in this way at least substantially without exposing a user to potentially hazardous materials and environment and at least substantially without contaminating a controlled environment within the interior of the enclosure 102.

The glove ports 116 and port covers have a cost, and glove ports 116 and port covers that have been pushed into the interior of the enclosure 102 may be contaminated, requiring their disposal, potentially in a manner that controls exposure to the consumed glove port 116 or port cover. These costs and tasks, and the cost and difficulty of installing a custom transfer port, make passing objects into and out of confinement glovebox 100 burdensome and potentially dangerous, particularly when a transfer port is not preinstalled in the confinement glovebox 100. Transfer ports 200 in accordance with this disclosure may enable easier retrofitting of an existing confinement glovebox 100 with a transfer port 200, and may enable passage of objects into and out of the enclosure 102 of the confinement glovebox 100 at lower cost and with less waste.

Figure 2:
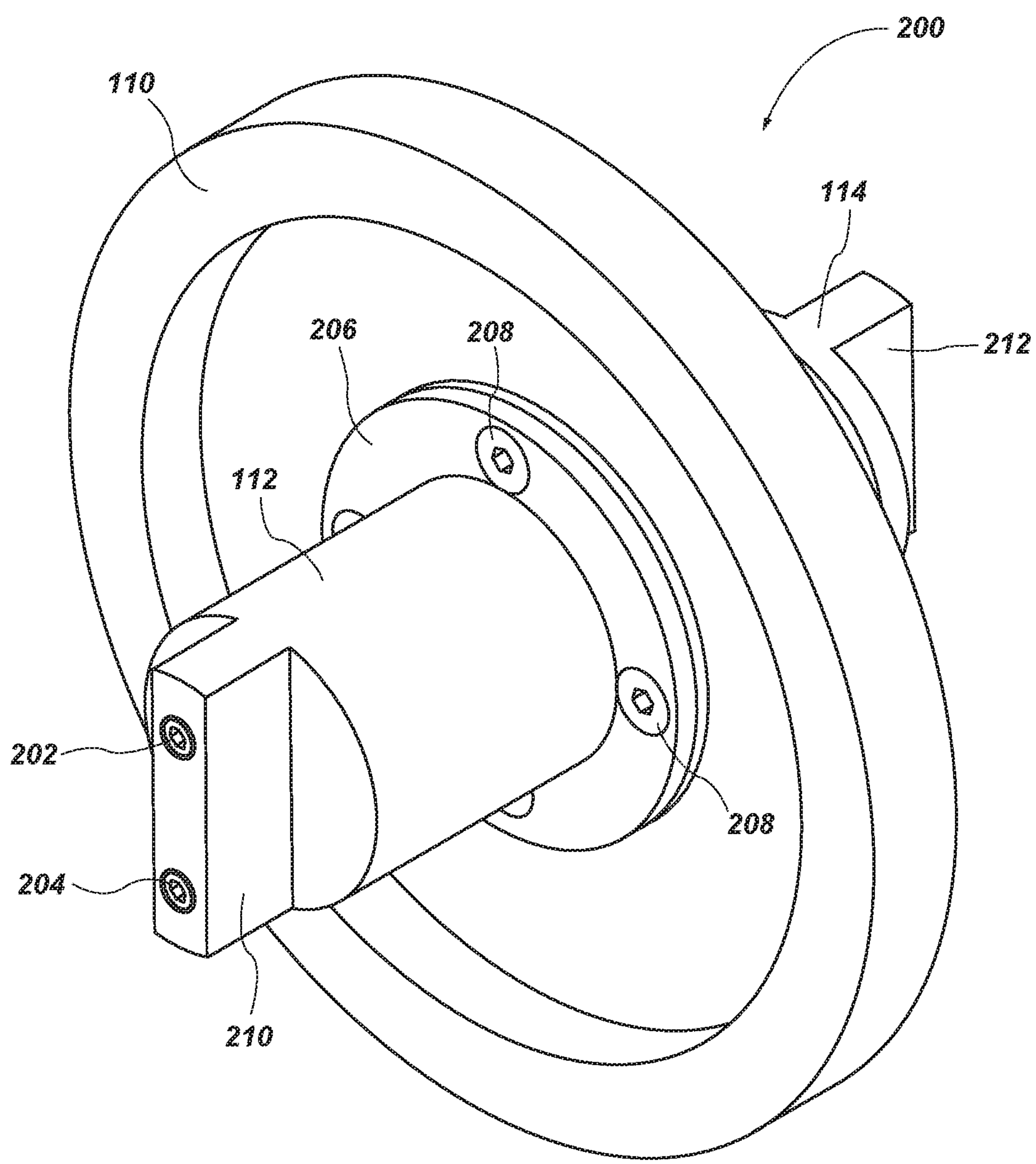
FIG. 2 is a perspective side view of the transfer port of FIG. 1.
Figure 3:
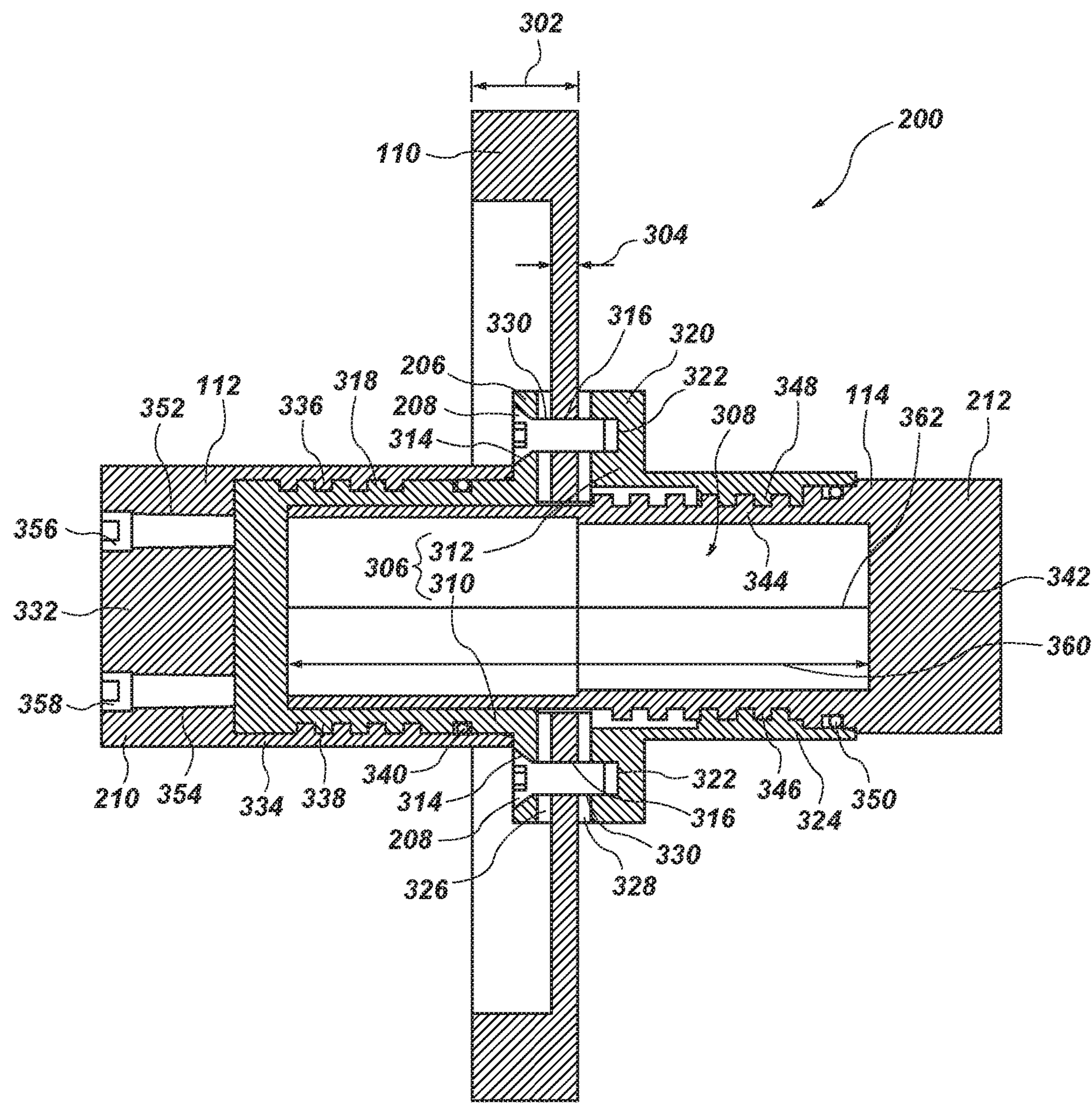
FIG. 3 is a cross-sectional side view of the transfer port of FIG. 2, with some changes illustrative of variations in the transfer port in accordance with this disclosure.

FIG. 2 is a perspective side view of the transfer port 200 of FIG. 1. FIG. 3 is a cross-sectional side view of the transfer port 200 of FIG. 2, with some changes illustrative of variations in the transfer port 200 in accordance with this disclosure. With combined reference to FIG. 2 and FIG. 3, the first flange 110 of the transfer port 200 may include a disk of a material suitable to provide a barrier between the interior and the exterior of the enclosure 102 (see FIG. 1) of a confinement glovebox 100 (see FIG. 1). More specifically, the first flange 110 may include a disk having a first thickness 302 proximate to a perimeter of the first flange 110 and a second thickness 304, smaller than the first thickness 302, in regions extending from the perimeter radially inward to the center of the disk. The size, shape, and first thickness 302 of the first flange 110 may enable the transfer port 200 to mate with, and be sealingly secured within, an opening 106 (see FIG. 1) of a confinement glovebox 100 (see FIG. 1). For example, the first flange 110 may be pushed into a gasket and/or cuff located within a periphery of the opening 106 (see FIG. 1) to support the first flange, and form a seal, within the opening 106 (see FIG. 1) of the confinement glovebox 100 (see FIG. 1), as disclosed in greater detail in, for example, U.S. Pat. No. 6,213,360 to Aluisi, issued Apr. 10, 2001, and U.S. Patent App. Pub. No. 2017/0021510 to Gurin, published Jan. 26, 2017.

The transfer port 200 may include a sleeve 306 securable to the first flange 110. The sleeve 306 may define a passage 308 through the first flange 110 when the sleeve 306 is secured to the first flange 110. In some embodiments, the sleeve 306 may include a first sleeve member 310 securable to the first flange 110 on a first side of the first flange 110. The sleeve 306 may also include a second sleeve member 312 securable to the first flange 110 on a second, opposite side of the first flange 110. The first sleeve member 310 and the second sleeve member 312 may be sized and shaped to cooperatively define the passage 308 through the first flange 110 when the first sleeve member 310 and the second sleeve member 312 are secured to the first flange 110.

More specifically, the first sleeve member 310 may include, for example, a second flange 206 located at one longitudinal end of the first sleeve member 310. The second flange 206 may be generally annular in shape, and may be sized and oriented for positioning proximate to the inner portion of the first flange 110 having the second thickness 304. The second flange 206 may include one or more first holes 314 (e.g., countersunk holes) extending through the second flange 206, which may be alignable with corresponding mating holes 316 extending through the first flange 110. The first sleeve member 310 may further include a first tubular section 318 oriented to extend from the second flange 206 away from the first flange 110 when the first sleeve member 310 is secured to the first flange 110. A central opening of the first tubular section 318 may be positioned for alignment with a corresponding central opening of the first flange 110 to grant access to the passage 308 through the first sleeve member 310 and the first flange 110.

Continuing the example, the second sleeve member 312 may include, for example, a third flange 320 located at one longitudinal end of the second sleeve member 312. The third flange 320 may be generally annular in shape, and may be sized and oriented for positioning proximate to the inner portion of the first flange 110 having the second thickness 304, on a side of the first flange 110 opposite the second flange 206. The third flange 320 may include one or more second holes 322 (e.g., through holes, blind holes) extending through the third flange 320, which may be alignable with the corresponding mating holes 316 extending through the first flange 110. An attachment member 208 (e.g., a bolt, screw, rivet) may extend through each respective first hole 314, corresponding mating hole 316, and at least partially through each corresponding second hole 322 to secure the first sleeve member 310 and the second sleeve member 312 to the first flange 110, and to form the sleeve 306 from the first sleeve member 310 and the second sleeve member 312. The second sleeve member 312 may further include a second tubular section 324 oriented to extend from the third flange 320 away from the first flange 110 when the second sleeve member 312 is secured to the first flange 110. A central opening of the second tubular section 324 may be positioned for alignment with the corresponding central opening of the first flange 110 to grant access to the passage 308 through the second sleeve member 312 and the first flange 110.

The transfer port 200 may include a first sealing member 326 located between the sleeve 306 and the first flange 110 on the first side and a second sealing member 328 located between the sleeve 306 and the first flange 110 on the second side. For example, the first sealing member 326 may include an O-ring of compressible material for positioning between the second flange 206 and the first flange 110 on an exterior-facing side of the transfer port 200, and the second sealing member 328 may include another O-ring of compressible material for positioning between the third flange 320 and the first flange 110 on an interior-facing side of the transfer port 200. Each of the first sealing member 326 and the second sealing member 328 may include one or more accommodating holes 330 to enable each respective attachment member 208 to pass through the first sealing member 326 and the second sealing member 328, forming seals between the first sealing member 326 and the first flange 110 and between the second sealing member 328 and the first flange 110.

The first cap 112 of the transfer port 200 may be configured to be secured to the sleeve 306 on a first side of the first flange 110 and to obstruct the passage 308 on the first side when the first cap 112 is secured to the sleeve 306. For example, the first cap 112 may include a first obstructing portion 332 generally shaped as a cylinder sized to occlude the passage 308 when the first cap 112 is secured to the first sleeve member 310, and a third tubular section 334 generally shaped as a sleeve sized to mate with the first tubular section 318 of the first sleeve member 310. More specifically, the third tubular section 334 of the first cap 112 may be sized to be positioned around the first tubular section 318 of the first sleeve member 310, and a distal end of the third tubular section 334 opposite the first obstructing portion 332 may be positioned to abut against the second flange 206 when the first cap 112 is secured to the first sleeve member 310 and is positioned as close to the first flange 110 as possible.

In some embodiments, the first cap 112 may include first threads 336 in an interior surface of the first cap 112 and the sleeve 306 may include second mating threads 338 in an exterior surface of the sleeve 306 on the first side, enabling the first cap 112 to be threaded on to the sleeve 306. For example, the third tubular section 334 of the first cap 112 may include first threads 336 in an interior surface of the third tubular section 334, and the first sleeve member 310 may include second mating threads 338 in an exterior surface of the first tubular section 318, enabling the first cap 112 to be threaded on to the first sleeve member 310 on the exterior-facing side of the transfer port 200. In other embodiments, the first cap 112 may be selectively securable on the sleeve 306 by a twist-and-lock connection, gasket mount, spring-loaded pin, or other mechanical connection.

A third sealing member 340 may be positioned and configured to form a seal between the first cap 112 and the sleeve 306, reducing the likelihood of exposure to any hazardous materials or atmospheres through the passage 308 to the first side of the first flange 110 when the first cap 112 is secured to the sleeve 306. For example, the third sealing member 340 may be located around the exterior surface of the sleeve 306 on the first side of the first flange 110, and may contact the interior surface of the first cap 112 when the first cap 112 is secured to the sleeve 306. More specifically, the third sealing member 340 may be located partially within a recess in, and may extend around, the exterior surface of the first tubular section 318 of the first sleeve member 310 in a position closer to the first flange 110 than the second mating threads 338, and may contact and seal against the interior surface of the third tubular section 334 of the first cap 112 when the first cap 112 is secured to the first sleeve member 310.

The second cap 114 of the transfer port 200 may be configured to be secured to the sleeve 306 on the second, opposite side of the first flange 110 and to obstruct the passage 308 on the second side when the second cap 114 is secured to the sleeve 306. For example, the second cap 114 may include a second obstructing portion 342 generally shaped as a cylinder sized to occlude the passage 308 when the second cap 114 is secured to the second sleeve member 312, and a fourth tubular section 344 generally shaped as a sleeve sized to mate with the second tubular section 324 of the second sleeve member 312. More specifically, the fourth tubular section 344 of the second cap 114 may be sized to be positioned within the second tubular section 324 of the second sleeve member 312, and a distal end of the fourth tubular section 344 opposite the second obstructing portion 342 may be cantilevered within the passage 308 when the second cap 114 is secured to the second sleeve member 312 and the second obstructing portion 342 thereof is positioned as close to the first flange 110 as possible.

In some embodiments, the second cap 114 may include third threads 346 in an exterior surface of the second cap 114 and the sleeve 306 may include fourth mating threads 348 in an interior surface of the sleeve 306 on the second side, enabling the second cap 114 to be threaded into the sleeve 306. For example, the fourth tubular section 344 of the second cap 114 may include third threads 346 in an exterior surface of the fourth tubular section 344, and the second sleeve member 312 may include fourth mating threads 348 in an interior surface of the second tubular section 324, enabling the second cap 114 to be threaded on to the second sleeve member 312 on the interior-facing side of the transfer port 200. In other embodiments, the second cap 114 may be selectively securable on the sleeve 306 by a twist-and-lock connection, gasket mount, spring-loaded pin, or other mechanical connection.

A fourth sealing member 350 may be positioned and configured to form a seal between the second cap 114 and the sleeve 306, reducing the likelihood of exposure to any hazardous materials or atmospheres through the passage 308 to the first side of the first flange 110 when the second cap 114 is secured to the sleeve 306. For example, the fourth sealing member 350 may be located around the exterior surface of the second cap 114, and may contact the interior surface of the sleeve 306 on the second side of the first flange 110 when the second cap 114 is secured to the sleeve 306. More specifically, the fourth sealing member 350 may be located partially within a recess in, and may extend around, the exterior surface of the fourth tubular section 344 of the second cap 114 in a position farther from the first flange 110 than the third threads 346 when the second cap 114 is secured to the second sleeve member 312, and may contact and seal against the interior surface of the second tubular section 324 of the second sleeve member 312 when the second cap 114 is secured to the second sleeve member 312.

In some embodiments, the second cap 114 may include a tube extending longitudinally from a closed end of the second cap 114. For example, the tube may be sized and shaped to extend at least partially through the passage 308 of the sleeve 306, and to extend from the second side beyond the first flange 110 when the second cap 114 is secured to the sleeve 306. More specifically, the fourth tubular section 344 of the second cap 114 may extend from the second obstructing portion 342, through the second tubular section 324 of the second sleeve member 312, and partially into the first tubular section 318 of the first sleeve member 310 on the first side of the first flange 110. As a specific, nonlimiting example, a longitudinal length 360 of the fourth tubular section 344, as measured along an axis 362 of the second cap 114, may be greater than about 50% (e.g., between about 60% and about 80%, such as 75%) of a greatest longitudinal dimension of the transfer port 200, as measured in the same direction. Configuring the fourth tubular section 344 of the second cap 114 to extend to the exterior-facing side of the first flange 110 may enable easier passage of objects through the transfer port 200. For example, an object introduced into the passage 308 from the first side will likely rest at least partially on the interior surface of the fourth tubular section 344 of the second cap 114. Once the first cap 112 is secured to the sleeve 306, removal of the second cap 114 in the interior of a confinement glovebox 100 (see FIG. 1) with the object supported in the second cap 114 may enable the object to be dropped from within the second cap 114 on to whatever location is desired within the confinement glovebox 100 (see FIG. 1). Such structure and operation may reduce the need for a user to reach into the confined space of the passage 308 through the transfer port 200 to retrieve an object, which may be particularly difficult when interacting using a glove port 116 (see FIG. 1).

In some embodiments, at least one other port may extend through a closed end of the first cap 112. For example, the first cap 112 may include at least a first other port 352 extending through the first obstructing portion 332 of the first cap 112 in a first location, and optionally a second other port 354 extending through the first obstructing portion 332 of the first cap 112 in a second, offset location, to provide selective fluid communication between the first side at the exterior of the transfer port 200 and the interior of the passage 308. The transfer port 200 may include a plug selectively positionable in each respective other port 352 and 354 or a valve located in the respective other port 352 or 354. For example, the transfer port 200 may include a first plug 356 for selectively obstructing the first other port 352 and a second plug 358 for selectively obstructing the second other port 354 (as shown in FIG. 3) or a first valve 202 for establishing selective fluid communication through the first other port 352 and a second valve for establishing selective fluid communication through the second other port 354. The first other port 352 and optional second other port 354, and associated first plug 356, second plug 358, first valve 202, or second valve 204, may be useful for testing the seals of the first valve 202 when assembled and installed to reduce risk of exposure to potentially hazardous materials and atmospheres. These components may also be useful for controlling (e.g., replacing) the atmosphere within the passage 308 during transmission of objects through the transfer port 200 to reduce the risk of contaminating a controlled environment within the associated confinement glovebox (see FIG. 1) and reduce the risk of exposure to potentially hazardous materials and atmospheres.

In some embodiments, at least one of the first cap 112 and the second cap 114 may include a grasping portion configured to enable at least partially automated equipment, such as, for example, and master/slave manipulator, to interact more easily with the respective first cap 112 or second cap 114. For example, the first cap 112 may include a first grasping portion 210 located proximate to a distal end of the first cap 112, and the second cap 114 may include a second grasping portion 212 located proximate to a distal end of the second cap 114. Each of the first grasping portion 210 and the second grasping portion 212 may have a smaller surface area than another portion of the respective first obstructing portion 332 of the first cap 112 or second obstructing portion 342 of the second cap 114 proximal to the first flange 110 when the first cap 112 or second cap 114 is secured to the sleeve 306. Such a reduced size tab, optionally having flat sides, may be easier for a master/slave manipulator or other partially or fully automated manipulator to interact with the first cap 112 and the second cap 114.

Rigid components of the transfer port 200, such as the first flange 110, sleeve 306, first cap 112, and second cap 114 may be made of one or more materials resistant to corrosion given the anticipated operating environment, resistant to passage of hazardous material and/or radiation, and having sufficient strength to withstand anticipated operating pressures and temperatures. For example, the rigid components of the transfer port 200 may include metals, metal alloys, plastics, or composite materials. Rigid components of one material may, for example, be coated with a second material for environmental resistance, or include a treated surface providing environmental resistance. Compressible components of the transfer port 200, such as the first sealing member 326, second sealing member 328, third sealing member 340, and fourth sealing member 350, may be made of materials resistant to corrosion given the anticipated operating environment, resistant to passage of hazardous material and/or radiation, and having sufficient resilience to maintain seals in anticipated operating pressures and temperatures. For example, the compressible components of the transfer port 200 may include elastomer materials.

Figure 4:
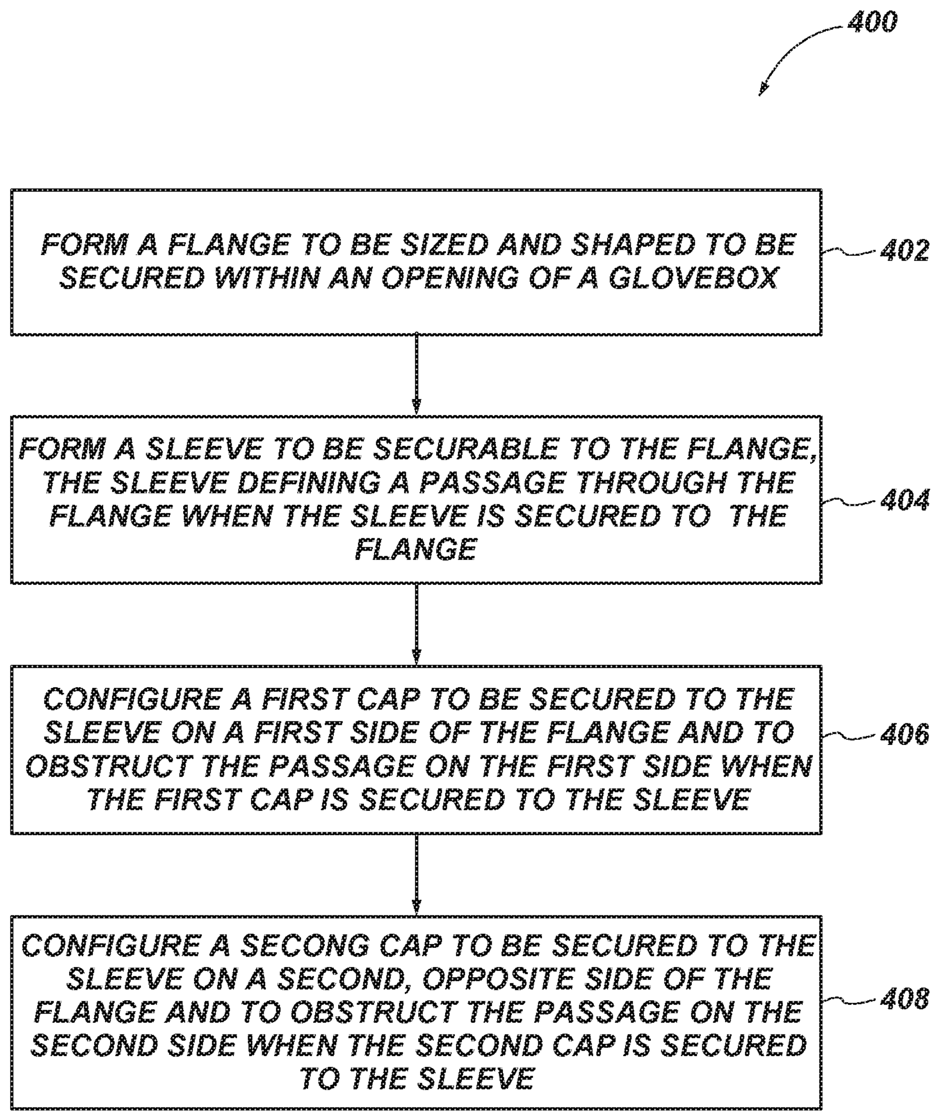
FIG. 4 is a flowchart of a method of making transfer ports in accordance with this disclosure.

FIG. 4 is a flowchart of a method 400 of making transfer ports 200 (see FIG. 1) in accordance with this disclosure. The method 400 may involve, for example, forming a first flange 110 (see FIG. 1) to be sized and shaped for securing within an opening 106 (see FIG. 1) of a confinement glovebox 100 (see FIG. 1), as indicated at act 402. A sleeve 306 (see FIG. 3) may be formed for securing to the first flange 110 (see FIG. 1), the sleeve 306 (see FIG. 3) configured to define a passage 308 (see FIG. 3) through the first flange 110 (see FIG. 1) when the sleeve 306 (see FIG. 3) is secured to the first flange 110 (see FIG. 1), as indicated at act 404. In some embodiments, forming the sleeve 306 (see FIG. 3) may involve forming to separate sleeve members: a first sleeve member 310 (see FIG. 3) for positioning on a first side of the first flange 110 (see FIG. 1) and a second sleeve member 312 (see FIG. 3) for positioning on a second, opposite side of the first flange 110 (see FIG. 1). A first cap 112 (see FIG. 1) may be configured to be secured to the sleeve 306 (see FIG. 3) on the first side of the first flange 110 (see FIG. 1) and to obstruct the passage 308 (see FIG. 3) on the first side when the first cap 112 (see FIG. 1) is secured to the sleeve 306 (see FIG. 3), as indicated at act 406. A second cap 114 may be configured to be secured to the sleeve 306 (see FIG. 3) on a second, opposite side of the first flange 110 and to obstruct the passage 308 (see FIG. 3) on the second side when the second cap 114 (see FIG. 1) is secured to the sleeve 306 (see FIG. 3), as indicated at act 408.

Figure 5:
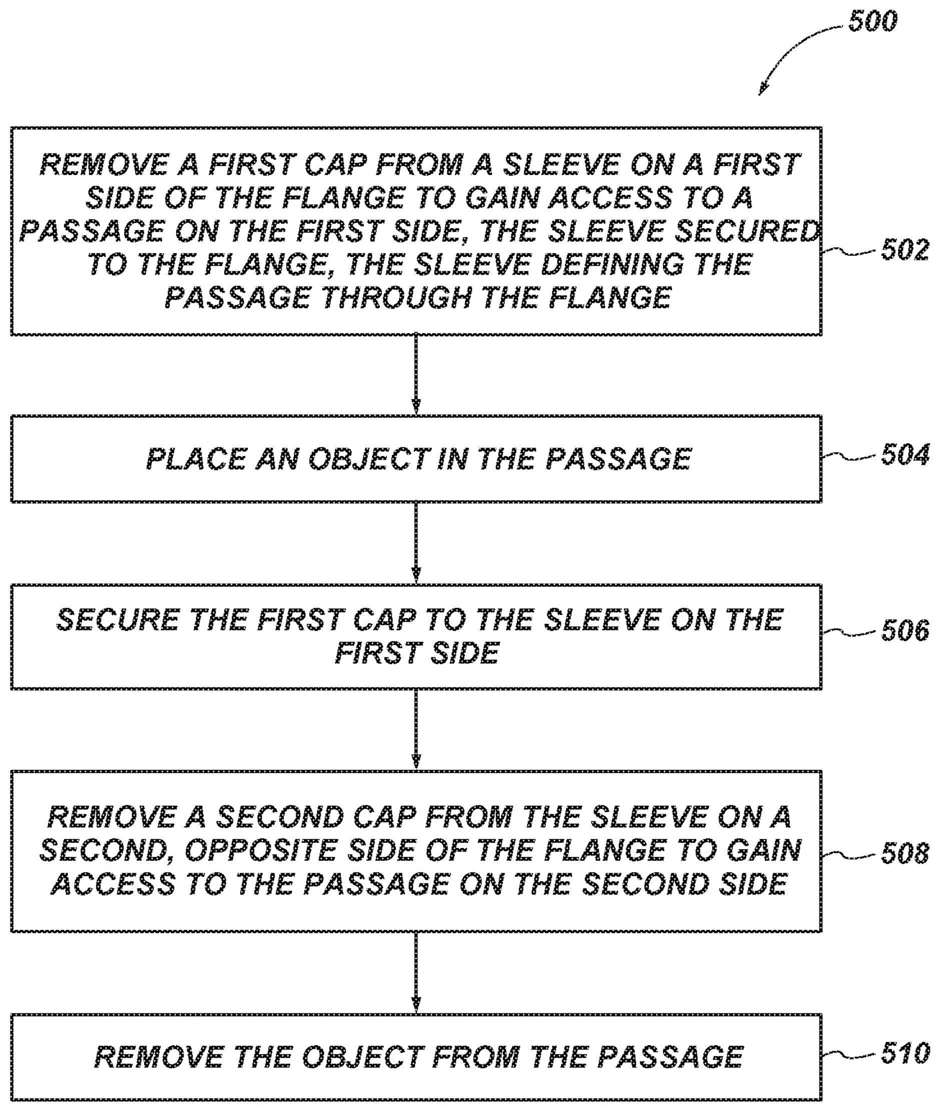
FIG. 5 is a flowchart of a method of using transfer ports in accordance with this disclosure.

FIG. 5 is a flowchart of a method 500 of using transfer ports 200 (see FIG. 1) in accordance with this disclosure. The method 500 may involve removing a first cap 112 (see FIG. 1) from a sleeve 306 (see FIG. 3) on a first side of a first flange 110 (see FIG. 1) secured within an opening 106 (see FIG. 1) of a confinement glovebox 100 (see FIG. 1) to gain access to a passage 308 (see FIG. 3) from the first side, as indicated at act 502. The sleeve 306 (see FIG. 3) may be secured to the first flange 110 (see FIG. 1), and the sleeve 306 (see FIG. 3) may define the passage 308 (see FIG. 3) through the flange when removing the first cap 112 (see FIG. 1). An object may then be placed in the passage 308 (see FIG. 3), as indicated at act 504. The first cap 112 (see FIG. 1) may then be secured to the sleeve 306 (see FIG. 3) on the first side, as indicated at act 506, which may seal the object within the passage 308 (see FIG. 3) and reduce the risk that any subsequent acts in the method 500 would result in exposure to hazardous materials and/or atmospheres on the first side of the first flange 110.

A second cap 114 (see FIG. 1) may be removed from the sleeve 306 (see FIG. 3) on a second, opposite side of the first flange 110 (see FIG. 1) to gain access to the passage 308 (see FIG. 3) on the second side, as reflected at act 508. The object may then be removed from the passage 308 (see FIG. 3), as indicated at act 510, which may result in transmission of the object into an interior of the confinement glovebox 100 (see FIG. 1).

In some embodiments, the first flange 110 (see FIG. 1) of the transfer port 200 (see FIG. 1) may first be secured within an opening 106 (see FIG. 1) of a confinement glovebox 100 (see FIG. 1). The introduction of the transfer port 200 (see FIG. 1) may be, for example, a retrofit of an existing confinement glovebox 100 (see FIG. 1) to include a transfer port 200 (see FIG. 1), or installation of the transfer port 200 (see FIG. 1) concurrently with construction and/or installation of the confinement glovebox 100 (see FIG. 1).

Following completion of any inspection, the first flange 110 (see FIG. 1) of the installed transfer port 200 (see FIG. 1) may be removed from the opening 106 (see FIG. 1) of the confinement glovebox 100 (see FIG. 1), and a first flange 110 (see FIG. 1) of another transfer port 200 (see FIG. 1) may be secured within the opening 106 (see FIG. 1) of the confinement glovebox 100 (see FIG. 1). Replacement of one transfer port 200 (see FIG. 1) with another transfer port 200 (see FIG. 1) may enable the first transfer port 200 (see FIG. 1) to be retrieved, cleaned and/or decontaminated for reuse. The replaceability of the transfer ports 200 (see FIG. 1) may also enable an inspection/examination procedure taking place in the confinement glovebox 100 (see FIG. 1) to be resumed more quickly in the event that the procedure must be stopped in a way that compromises the safety of personnel around the confinement glovebox 100 (see FIG. 1) and potentially contaminates the existing, installed transfer port 200 (see FIG. 1).

In some embodiments, removal of the first cap 112 (see FIG. 1), placement of the object in the passage 308 (see FIG. 3), and replacement of the first cap 112 (see FIG. 1) may be accomplished utilizing an automated or partially automated manipulator, such as, for example, a master/slave manipulator.

A leak check may optionally be performed on the transfer port 200 (see FIG. 1) utilizing at least one other port extending through a closed end of the first cap 112 (see FIG. 1). For example, a gas of a known composition, temperature, and pressure state may be introduced into the passage 308 (see FIG. 3) of the transfer port 200 (see FIG. 1), and optionally in the interior of the associated confinement glovebox 100 (see FIG. 1). The first other port 352 (see FIG. 3) and the second other port 354 (see FIG. 3) (in embodiments including the second other port 354 (see FIG. 3)) may be closed (e.g., by placing the first plug 356 (see FIG. 3) and the second plug 358 (see FIG. 3) therein or by closing the first valve 202 (see FIG. 2) and the second valve 204 (see FIG. 2)), and any escaping gas may be detected utilizing a sensor or sensors, revealing the leak rate, and corresponding quality of seal, of the transfer port 200 (see FIG. 1).

A composition of an atmosphere within the passage 308 (see FIG. 3) may be altered utilizing pressure across the first other port 352 (see FIG. 3) extending through the closed end of the first cap 112 in a first location and the second other port 354 (see FIG. 3) extending through the closed end of the first cap 112 (see FIG. 1) in a second, offset location. Changing the composition of the atmosphere within the passage 308 (see FIG. 3) may enable opening of the second cap 114 (see FIG. 1) without contaminating the interior of the confinement glovebox 100 (see FIG. 1) by introducing gases from the atmosphere at the exterior, so long as the first cap 112 (see FIG. 1) remains in a closed state. Changing the composition of the atmosphere within the passage 308 (see FIG. 3) may also enable opening of the first cap 112 (see FIG. 1) without exposing personnel to potentially hazardous materials and/or atmospheres, so long as the second cap 114 (see FIG. 1) remains in a closed state.

Transfer ports for confinement gloveboxes in accordance with this disclosure may enable easier deployment of the transfer ports and easier replacement and reconditioning of the transfer ports due at least in part to their operability with existing openings in those confinement gloveboxes. The transfer ports may also reduce human exposure to potentially hazardous materials and environments due at least in part to their materials, construction, and optional atmospheric control. Use of the transfer ports disclosed herein may reduce costs and waste when compared to conventional, custom built transfer ports and passing objects through replacing glove ports. Automated interaction with the transfer ports and associated material transfer through the transfer ports may also be more easily enabled utilizing the designs and techniques disclosed herein.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed. In addition, features from one disclosed embodiment may be combined with features of another disclosed embodiment while still being within the scope of this disclosure.

What is claimed is:

1. A transfer port for a confinement glovebox, comprising:

a flange sized and shaped to be secured within an opening in a wall of a glovebox;

a sleeve secured to the flange and defining a passage through the flange;

a first cap removably secured to the sleeve on a first side of the flange and obstructing the passage on the first side; and a second cap removably secured to the sleeve on a second, opposite side of the flange and obstructing the passage on the second side;

wherein the second cap comprises a tube extending longitudinally from a closed end of the second cap at least partially through the passage of the sleeve from the second side beyond the flange to the first side such that, when the second cap is removed from the sleeve, the tube is configured to be removed out of the passage.

2. The transfer port of claim 1, wherein the first cap comprises threads in an interior surface thereof and the sleeve comprises mating threads in an exterior surface thereof on the first side.

3. The transfer port of claim 1, further comprising a sealing member located around an exterior surface of the sleeve on the first side, the sealing member positioned and shaped to form a seal with the first cap.

4. The transfer port of claim 1, wherein the second cap comprises threads in an exterior surface thereof and the sleeve comprises mating threads in an interior surface thereof on the second side.

5. The transfer port of claim 1, further comprising a sealing member located around an exterior surface of the second cap, the sealing member positioned and shaped to form a seal with the sleeve.

6. The transfer port of claim 1, wherein a longitudinal length of the tube, as measured along an axis of the second cap, is between about 60% and about 80% of a greatest longitudinal dimension of the transfer port, as measured in a same direction.

7. The transfer port of claim 1, wherein a longitudinal length of the tube, as measured along an axis of the second cap, is greater than about 50% of a greatest longitudinal dimension of the transfer port, as measured in a same direction.

8. The transfer port of claim 1, further comprising a first sealing member located between the sleeve and the flange on the first side and a second sealing member located between the sleeve and the flange on the second side.

9. The transfer port of claim 1, further comprising at least one other port extending through a closed end of the first cap.

10. The transfer port of claim 9, wherein the at least one other port comprises a first other opening extending through the closed end of the first cap in a first location and a second other opening extending through the closed end of the first cap in a second, offset location.

11. The transfer port of claim 9, further comprising a plug selectively positionable in the at least one other port or a valve located in the at least one other port.

12. The transfer port of claim 1, wherein each of the first cap and the second cap comprises a grasping portion located proximate to a distal end of the respective first cap or second cap, the grasping portion comprising a smaller surface area than another portion of the respective first cap or second cap proximal to the flange.

13. A transfer port for a confinement glovebox, comprising:

a flange sized and shaped to be secured within an opening in a wall of a glovebox;

a first sleeve member secured to the flange on a first side of the flange;

a second sleeve member secured to the flange on a second, opposite side of the flange, the first sleeve member and the second sleeve member sized and shaped to, in combination, define a passage through the flange;

a first cap removably secured around the first sleeve on the first side of the flange and obstructing the passage on the first side; and a second cap removably secured at least partially within the second sleeve on the second side of the flange and obstructing the passage on the second side;

wherein the second cap comprises a tube extending longitudinally from a closed end of the second cap at least partially through the passage of the sleeve from the second side beyond the flange to the first side such that, when the second cap is removed from the sleeve, the tube is configured to be removed out of the passage.

14. A method of assembling a transfer port for a confinement glovebox, comprising:

securing a sleeve to a flange sized and shaped for securing within an opening in a wall of a glovebox, the sleeve defining a passage through the flange;

removably securing a first cap to the sleeve on a first side of the flange and obstructing the passage on the first side utilizing the first cap; and removably securing a second cap to the sleeve on a second, opposite side of the flange and obstructing the passage on the second side utilizing the second cap, the second cap comprising a tube extending longitudinally from a closed end of the second cap at least partially through the passage of the sleeve from the second side beyond the flange to the first side such that, when the second cap is removed from the sleeve, the tube is configured to be removed out of the passage.

15. A method of using a transfer port for a confinement glovebox, comprising:

removing a first cap from a sleeve on a first side of a flange secured within an opening in a wall of a glovebox to gain access to a passage from the first side outside the glovebox, the sleeve secured to the flange, the sleeve defining the passage through the flange;

placing an object in the passage;

securing the first cap to the sleeve on the first side;

removing a second cap from the sleeve on a second, opposite side of the flange within the glovebox to gain access to the passage on the second side to cause a tube extending longitudinally from a closed end of the second cap and positioned at least partially within the passage of the sleeve to move from the second side, past the flange to the first side and out of the passage when the second cap is removed from the sleeve; and removing the object from the passage from within the glovebox.

16. The method of claim 15, further comprising, before removing the first cap, securing the flange within an opening in the wall of the glovebox.

17. The method of claim 16, further comprising removing the flange from the opening of the glovebox, and securing a flange of another transfer port within the opening in the wall of the glovebox.

18. The method of claim 15, further comprising using a master/slave manipulator to remove the first cap, place the object in the passage, and secure the first cap to the sleeve.

19. The method of claim 15, further comprising performing a leak check on the transfer port utilizing at least one other port extending through a closed end of the first cap.

20. The method of claim 15, further comprising changing a composition of an atmosphere within the passage utilizing pressure across a first other port extending through a closed end of the first cap in a first location and a second other port extending through the closed end of the first cap in a second, offset location.

* * * * *

UNITED STATES PATENT AND TRADEMARK OFFICE

CERTIFICATE OF CORRECTION

PATENT NO. : 11,772,581 B2
APPLICATION NO. : 17/061333
DATED : October 3, 2023
INVENTOR(S) : Aaron A. Balsmeier It is certified that error appears in the above-identified patent and that said Letters Patent is hereby corrected as shown below:

In the Claims

Claim 15, Column 14, Line 20, change “first side and out” to --first side; and out--

Signed and Sealed this
Twenty-first Day of November, 2023

Katherine Kelly Vidal

Katherine Kelly Vidal
*Director of the United States Patent and Trademark Office*